(12) United States Patent
Becker et al.

(10) Patent No.: US 10,272,644 B2
(45) Date of Patent: Apr. 30, 2019

(54) SHEET STEEL PRODUCT, A STEEL COMPONENT PRODUCED FROM SUCH A SHEET STEEL PRODUCT, AND BODY FOR A MOTOR VEHICLE

(71) Applicant: ThyssenKrupp Steel Europe AG, Duisburg (DE)

(72) Inventors: Jens-Ulrik Becker, Duisburg (DE); Thomas Gerber, Dortmund (DE); Julia Mura, Dusseldorf (DE); Stefan Myslowicki, Mönchengladbach (DE)

(73) Assignee: THYSSENKRUPP STEEL EUROPE AG, Duisburg (DE)

( * ) Notice: Subject to any disclaimer, the term of this patent is extended or adjusted under 35 U.S.C. 154(b) by 273 days.

(21) Appl. No.: 15/105,679

(22) PCT Filed: Dec. 19, 2014

(86) PCT No.: PCT/EP2014/003441
§ 371 (c)(1),
(2) Date: Jun. 17, 2016

(87) PCT Pub. No.: WO2015/090608
PCT Pub. Date: Jun. 25, 2015

(65) Prior Publication Data
US 2016/0311197 A1    Oct. 27, 2016

(30) Foreign Application Priority Data
Dec. 20, 2013    (EP) .................................... 13199058

(51) Int. Cl.
*B32B 15/01* (2006.01)
*C22C 38/02* (2006.01)
(Continued)

(52) U.S. Cl.
CPC .......... *B32B 15/011* (2013.01); *C22C 38/002* (2013.01); *C22C 38/004* (2013.01);
(Continued)

(58) Field of Classification Search
None
See application file for complete search history.

(56) References Cited

U.S. PATENT DOCUMENTS

| | | |
|---|---|---|
| 2009/0220815 A1 | 9/2009 | Canourgues et al. |
| 2011/0111252 A1* | 5/2011 | Becker .................. B32B 15/011 |
| | | 428/624 |

(Continued)

FOREIGN PATENT DOCUMENTS

| | | |
|---|---|---|
| DE | 102007022453 A1 | 11/2008 |
| DE | 102008022709 A1 | 11/2009 |

(Continued)

OTHER PUBLICATIONS

He et al., "Research on Mechanical Properties of 22MnB5 Steel Quenched in a Steel Die", J. Shanghai Jiaotong Univ., 2011, vol. 16 Issue 2, pp. 129-132. (Year: 2011).*

(Continued)

*Primary Examiner* — Humera N Sheikh
*Assistant Examiner* — Xiaobei Wang
(74) *Attorney, Agent, or Firm* — The Webb Law Firm

(57) ABSTRACT

A flat steel product is disclosed which is particularly suitable for the production of components for motor vehicle bodies by press-hardening, and which has insensitivity to cracking coupled with increased strength and has sufficient suitability for welding for incorporation into a welded construction. This combination of properties is achieved in accordance with the invention by virtue of the flat steel product having a core layer consisting of a steel alloyed with Mn, B and at least 0.3% by weight of C and having a tensile strength of (Continued)

more than 1500 MPa, and an outer layer cohesively bonded to the core layer. The C content of the outer layer is not more than 0.09% by weight. This flat steel product has, in the region of the outer layer, a tensile strength corresponding to not more than half the tensile strength of the steel of the core layer in the ready-hardened state, with the elongation A80 of the outer layer corresponding to at least 1.5 times the elongation A80 of the core layer in the ready-hardened state.

20 Claims, 3 Drawing Sheets

(51) Int. Cl.
    *C22C 38/04*     (2006.01)
    *C22C 38/06*     (2006.01)
    *C22C 38/38*     (2006.01)
    *C22C 38/28*     (2006.01)
    *C22C 38/00*     (2006.01)
    *C22C 38/26*     (2006.01)
    *C22C 38/32*     (2006.01)

(52) U.S. Cl.
    CPC .............. *C22C 38/02* (2013.01); *C22C 38/04* (2013.01); *C22C 38/06* (2013.01); *C22C 38/26* (2013.01); *C22C 38/28* (2013.01); *C22C 38/32* (2013.01); *C22C 38/38* (2013.01)

(56) References Cited

U.S. PATENT DOCUMENTS

| | | |
|---|---|---|
| 2012/0279621 A1 | 11/2012 | Gerber et al. |
| 2014/0037980 A1 | 2/2014 | Kawasaki |
| 2015/0017476 A1 | 1/2015 | Tachibana et al. |

FOREIGN PATENT DOCUMENTS

| | | |
|---|---|---|
| EP | 1908547 A2 | 4/2008 |
| JP | 2009534529 A | 9/2009 |
| JP | 2010174278 A | 8/2010 |
| JP | 4960289 B2 | 3/2012 |
| JP | 2013527312 A | 6/2013 |
| JP | 5352766 B2 | 9/2013 |
| JP | 2013177674 A | 9/2013 |
| JP | 6037087 B1 | 11/2016 |
| KR | 1020130002214 A | 1/2013 |
| WO | 2012157581 A1 | 11/2012 |

OTHER PUBLICATIONS

Bordignon et al., Influence of additive elements on galvanizing of high strength steels, European Commission, technical steel research, Surface characteristics, 2004, pp. 1-107, EUR 20954, Luxembourg.
BSS Steel Strip, Steel Strip Specifications, Steelstrip Co., UK, Apr. 28, 2012, retrieved from the Internet: Mar. 17, 2017, www.steelstrip.co.uk/international_equivalents.htm.
Hoesch Hohenlimburg, 22MnB5: Warmgewalztes Mittelband Werkstoffdatenblatt, ThyssenKrupp, Aug. 2013, retrieved from the Internet: Mar. 17, 2017, www.hoesch-hohenlimburg.de/projekt/web2013/hhowebcms.nsf.
Karbasian et al., A Review on Hot Stamping, Journal of Materials Processing Technology, Jul. 19, 2010, pp. 2103-2118, vol. 210, Elsevier, BV.
U.S. Steel Kosice, s.r.o., Micro-Alloyed Grade Sheets, Mar. 12, 2005, retrieved from the Internet: Mar. 17, 2017, www.usske.sk/produts/cat/coated/hot-dip/micoralloyed.html.
Yi Feng, "Metallic Materials", pp. 64-65, National Defense Industry Press.
Mingzhi Yu et al., "Handbook of Steel Products", pp. 448-450, Chemical Industry Press.
W.C. Leslie, "Physical Metallurgy of Steel", p. 291, Chinese Metallurgical Industry Press.

* cited by examiner

SHEET STEEL PRODUCT, A STEEL COMPONENT PRODUCED FROM SUCH A SHEET STEEL PRODUCT, AND BODY FOR A MOTOR VEHICLE

CROSS-REFERENCE TO RELATED APPLICATIONS

This application is the United States national phase of International Application No. PCT/EP2014/003441 filed Dec. 19, 2014, and claims priority to European Patent Application No. 13199058.2 filed Dec. 20, 2013, the disclosures of which are hereby incorporated in their entirety by reference.

BACKGROUND OF THE INVENTION

Field of the Invention

The invention relates to a steel for the production in a steel component, to a flat steel product consisting in at least sections of such a steel, to a steel component produced from such a flat steel product by hot forming and quenching, and to a bodywork produced from such a steel component.

Description of Related Art

The term "flat steel product" is understood here to mean steel sheets or steel strips produced by a rolling process and sheet bars divided therefrom and the like.

If alloy contents are reported in "%", this always means "% by weight" unless explicitly stated otherwise.

Requirements in the automobile construction sector are increasing ever further in respect of passenger safety in the event of a crash. At the same time, lightweight construction is an important prerequisite for compliance with the legally stipulated $CO_2$ limits and for the minimization of the energy input required to drive the vehicle. There are likewise ever higher demands in terms of comfort on the part of users of vehicles, which leads to an increased level of electronic components in the vehicle and an increasing vehicle weight as a result. In order to simultaneously fulfill these opposing requirements, the focus has long been on lightweight design in the manufacture of bodywork structures for automobile construction.

For automobile components of relevance in respect of crash safety, components which have become established here are especially those which are produced by hot forming, followed by hardening, of flat steel products consisting of a manganese-boron steel. This manufacturing method, which is also referred to in the field as press-hardening, can produce components which, in spite of optimally low wall thicknesses and associated minimized weight, can be used at locations in a vehicle body that are particularly sensitive in respect of their performance in the event of a crash.

A typical example of a manganese-boron steel of the aforementioned type is the steel known in the technical field by the designation 22MnB5, which has been given materials number 1.5528. By hot forming and subsequent press-hardening, it is possible to use steels of this kind to produce components having optimal dimensional stability coupled with complex geometry.

The components manufactured by press-hardening from MnB steels, because of their predominantly martensitic microstructure, attain very high strengths coupled with low weight. In this context, MnB-alloyed steel varieties that have been found to be useful are those having a tensile strength Rm of about 1500 MPa and yield point $R_{P0.2}$ of about 1100 MPa. A steel which forms part of the class of the MnB steels and affords corresponding strength values includes, as well as iron and unavoidable impurities from the smelting process, for example, (in % by weight) 0.22-0.25% C, 0.2-0.3% Si, 1.2-1.4% Mn, up to 0.025% P, up to 0.01% S, 0.02-0.05% Al, 0.1-0.2% Cr, 0.025-0.04% Ti and 0.002-0.0035% B.

The aim of more recent developments has been to manufacture steel components for automobile bodywork construction which attain even higher strengths. Such hot-formed steels having elevated strength make use of steel concepts which are similar to the general type of the above-elucidated MnB steels but have higher carbon contents which, in the hardened state, lead to higher material or component strengths. These elevated material or component strengths are associated with high hardness. Correspondingly alloyed MnB steels regularly reach tensile strengths of 1700 MPa or more.

Particularly as a result of mechanical cutting operations in the further processing of components produced from the high-strength MnB steels having high carbon contents by press-hardening, however, there is the risk that localized residual stresses or residual stress gradients will be introduced into the components. Because of the high hardness of the material, these lead to great sensitivity to hydrogen-induced cracking. Components produced from the high-strength steel materials can therefore be implemented only with exact control of the installation situation and stress. In the case of processing, under some circumstances, it is also necessary to dispense with cutting in the hardened state or to employ additional annealing steps and exact atmospheric monitoring in the hot forming operation.

A further problem in the processing of components produced from steels having moderate to high carbon contents arises from their reduced weldability. The reduced suitability for welding is manifested particularly in a comparably low durability of the weld points made for welding of similar or different steel types. As a result of the relative weakness of the weld points, the components are unable to display their overall strength.

DE 10 2008 022 709 A1 already discloses that components for motor vehicle bodies can be manufactured from composite materials produced by roll cladding, in which individual layers consisting of different steels are combined with one another such that the composite material or the component manufactured therefrom gains properties that would not be achieved by a component formed from a flat steel product consisting of a homogeneous steel. It is thus possible, according to this prior art, for example, to combine a crack-insensitive steel having good formability as an outer layer with a high-strength MnB steel, in order to form a B pillar or comparable bodywork structure element therefrom. The material of the outer layer may be selected such that the core layer provides the requisite strength and the outer layer protects the core layer from hydrogen-induced cracking and provides adequate weldability. However, this prior art is restricted to the use of conventional steels as material for the core layer that are within the strength range of up to 1500 MPa.

SUMMARY OF THE INVENTION

Against the background of the above-elucidated prior art, it is an object of the invention to specify a flat steel product which is particularly suitable for the production of components for motor vehicle bodies by press-hardening, and which has insensitivity to cracking coupled with further-increased strength and has sufficient suitability for welding for incorporation into a welded construction.

The intention was likewise to provide a corresponding component for a vehicle body and a body comprising such a component, in which a highly durable bond of the component in question to the adjoining components is assured.

In relation to the flat steel product, this object has been achieved in accordance with the invention by virtue of such a flat steel product having the features specified in claim 1.

In relation to the component, the above-specified object is accordingly achieved by virtue of it being produced by hot forming and subsequent hardening of a flat steel product formed in accordance with the invention.

Finally, the way in which the abovementioned object in relation to the body for a motor vehicle is achieved in accordance with the invention is that such a body includes at least one component which has been formed in accordance with the invention and which is bonded to at least one further component of the body by welding.

Advantageous configurations of the invention are specified in the dependent claims and are elucidated individually hereinafter, as is the general concept of the invention.

A steel product of the invention thus comprises, in accordance with the abovementioned prior art, a core layer and an outer layer cohesively bonded to the core layer.

According to the invention, the core layer consists of a steel which has been alloyed with Mn, B and at least 0.3% by weight of C and has a tensile strength of more than 1500 MPa, especially more than 1650 MPa, in the ready-hardened state. It will be apparent here that only the alloy elements that are the primary determinants of the properties of the steel of the core layer are mentioned here, and that the steel may contain further alloy elements in effective contents in order to shape particular properties in each case.

The outer layer cohesively bonded to the core layer, by contrast, has a much lower C content of not more than 0.09% by weight. Correspondingly, in the region of the outer layer as well, the tensile strength of the inventive flat steel product is not more than half the tensile strength of the steel of the core layer in the ready-hardened state. At the same time, the inventive flat steel product has, in the region of its outer layer, an elongation A80 of at least 1.5 times the elongation A80 of the core layer in the ready-hardened state.

The invention thus combines, as material for the core layer, a steel having a distinct rise in strength relative to the prior art by virtue of a high C content with a steel having good formability intended for the outer layer, the C content of which has been lowered such that it firstly has optimal formability characterized by comparably low strength and high elongation values and can secondly be welded particularly efficiently to other steel components to give a bodywork structure.

In this way, the invention provides a means of making high-strength MnB steels having high C contents and correspondingly high tensile strength and hardness available to broader use in vehicle bodywork construction. The principle of achievement underlying the invention is based on a layered structure of the inventive flat steel product. At the surface (outer layer) there is a comparatively low strength (hardness), whereas the core layer consists of a high-strength steel in the state obtained after the hot press-hardening.

The comparatively soft surface layer (outer layer) is primarily less sensitive to initiation of cracking, since the material here has reduced edge crack sensitivity or notch sensitivity because of its lower hardness. This makes the composite material of the invention less sensitive to the phenomenon of the delayed fracture of a component manufactured from the flat steel product of the invention that occurs as a result of ingress of hydrogen at surface cracks. Delayed fracture occurs when the material has been exposed to a corrosive medium. Delayed fracture sensitivity basically rises with the strength of the material. In the present invention, the outer layer which is less sensitive to delayed fracture shields the more sensitive core from the corrosive medium. The ultrahigh strength of the core gives rise to materials which, in terms of total strength, are higher than the composite materials manufactured on the basis of conventional MnB steels. A further condition for a delayed fracture is the occurrence of a critical stress state in the stressed material. In the event of stress on the material, for example as a result of bending, the surface layer is subjected to greater stress than the core. In a material composite of the invention, the stresses that occur on the surface can be more readily dissipated through use of a softer outer layer than in the stronger core layer, which brings about lower delayed fracture sensitivity of the material composite compared to the material of the core layer.

Furthermore, the soft outer layers lead to better forming properties. By virtue of the soft, low strengths envisaged in accordance with the invention and boundary layers having high elongation, it is possible to achieve higher bending angles in the static plate bending test (VDA 230-100). Both aspects are important in the event of crash stresses and delay the initiation of cracking and induction of cracking, as a result of which higher energy absorption overall is achieved in the event of a crash.

As well as the avoidance of cracks, the layer structure of the invention in a composite material contributes to improvement of weldability. It is found here that, because of the low C content of the outer layer of a flat steel product of the invention, there is no embrittlement that otherwise occurs in the case of MnB steels with high C content and accompanying weakening of the weld bonds of such hot-formed steels. In order to assure this effect, the steel of the outer layer has a C content of not more than 0.09% by weight, preferably of less than 0.07%. Steels of this kind are known per se. They are, for example, conventional IF steels or steels known by the trade designations "DC03" and "H340", up to and including complex phase steels.

In the present invention, the term "composite material" refers to a material of multilayer structure which is also referred to as material composite.

By virtue of the multilayer structure of the composite material of the invention, in the welding operation, the weld nugget becomes joined to its environment in the region of the transition from the outer soft to the hard core layer. By providing for a sufficient thickness of the outer layer, i.e. through a suitable choice of the ratio of thickness of the applied layer relative to the thickness of the core, it is correspondingly possible to achieve a positive influence on the weld quality on the one hand (process) and the durability of the finished weld bond for the purpose of maximum transmission of force on the other hand.

It is true that the use of a flat steel product which is in multilayer form in accordance with the invention and has been provided with a low-carbon outer layer of very good weldability entails a drop in the strength of the flat steel product of the invention compared to a flat steel product manufactured exclusively from the steel of the core layer. However, it has been found that, surprisingly, the total strength of a component manufactured from a flat steel product of the invention, in spite of the combination with a soft outer layer material of low strength, is still well above the strength of a component manufactured from a conventional high-strength MnB steel.

In order to assure sufficiently high strengths of the steel of the core layer in the hardened state, the steel envisaged in accordance with the invention for the core layer has at least 0.3% by weight of C, which is found to be advantageous with regard to the desired strength.

The invention thus provides a flat steel product where a high strength and a high forming capacity are coupled with good suitability for welding and low crack sensitivity. The invention thus eliminates the restrictions which exist in the prior art in the use of high-strength MnB steels having C contents of at least 0.3% by weight.

The thickness ratio of outer layer to core layer can be decided on the basis of what is to be the principal property of the flat steel product of the invention. In principle, it can be assumed that the core layer makes up 40-95% of the thickness of the flat steel product. The core layer should in principle be thicker than any individual outer layer. If a maximum strength is to be assured together with good formability and sufficient protection against cracking, this is achieved by virtue of the core layer making up 70-95% of the thickness of the flat steel product, and the outer layer thus being comparatively thin in relation to the core layer. If, in contrast, optimized weldability is to be assured, it has been found to be appropriate when the core layer makes up 60-<70% of the thickness of the flat steel product. The outer layer is thicker in this case, such that a comparatively large volume of soft, low-carbon and hence comparatively non-embrittlement-prone steel of the outer layer is available for the welding operation. The total sheet thickness, i.e. the sum total of the thicknesses of the core layer and outer layer, of a flat steel product of the invention is typically from 0.3 mm to 8 mm, preferably from 0.5 mm to 3.5 mm.

Typically, the steel used for the core layer of a flat steel product of the invention has an intrinsic tensile strength of at least 1700 MPa.

Optimal forming properties of a flat steel product of the invention arise when the tensile strength of the outer layer corresponds to not more than one third of the tensile strength of the core layer. A steel of particularly good suitability for the outer layer and containing 0.08% by weight of C here has, for example, at an elongation A80 of at least 21%, a tensile strength of 400-500 MPa and a yield point of 340-420 MPa.

In order to assure the desired formability with simultaneously reliable protection against cracking, the elongation A80 of the outer layer may be at least twice as high, especially at least as high, as the elongation A80 of the core layer in the ready-hardened state.

The outer layer can be applied to the core layer by roll cladding. A process suitable for this purpose is described, for example, in DE 10 2005 006 606 B3, the content of which is incorporated into the present application for the purpose of elucidation of the operating steps typically executed by the person skilled in the art in roll cladding.

If symmetric properties are to be established over the thickness of the flat steel product, this can be achieved via a symmetric structure of the steel layers used. A structure which has been found to be particularly reliably workable in terms of production is a three-layer structure in which the core layer is covered by one outer layer above and one outer layer below the core layer. If the outer layers consist of steel layers of the same thickness and composition, this is advantageous for the simplification of the process regime.

A steel usable in practice for the core layer typically consists, as well as iron and unavoidable impurities from the production process, of (in % by weight)
C: 0.3-0.5%, especially 0.3-0.45%,
Si: 0.150-0.350%, especially 0.2-0.28%,
Mn: 1.100-1.400%, especially 1.15-1.3%,
Al: 0.020-0.050%, especially 0.03-0.04%,
Cr: 0.100-0.500%, especially 0.14-0.45%,
Ti: 0.020-0.040%, especially 0.026-0.034%,
B: 0.002-0.004%, especially 0.002-0.003%.

The impurities here include P: up to 0.020%, S: up to 0.003%, Cu: up to 0.100%, Mo: up to 0.050%, N: up to 0.007%, Ni: up to 0.100%, Nb: up to 0.003%, V: up to 0.010%, Sn: up to 0.030%, Ca: up to 0.005%.

The outer layer of a flat steel product of the invention, in contrast, typically consists of a steel which, as well as iron and unavoidable impurities from the production process (in % by weight), comprises
C: up to 0.09%, especially 0.002-0.075%,
Si: up to 0.7%, especially 0.01-0.6%,
Mn: 0.10-1.9%, especially 0.13-1.8%,
Al: up to 0.06%, especially 0.03-0.04%,
Cr: up to 0.4%, especially 0.025-0.35%,
Nb: up to 0.025%, especially 0.002-0.02%,
Ti: up to 0.13%, especially 0.002-0.12%, The impurities include P: up to 0.025%, S: up to 0.015%, Cu: up to 0.15%, Mo: up to 0.05%, N: up to 0.006%, Ni: up to 0.15%, V: up to 0.02%, B: up to 0.001%, Sn: up to 0.04% and Ca: up to 0.003%.

Carbon is an alloy element which has an exceptional strength-enhancing effect, in that the tendency to form specifically hard microstructure constituents such as pearlite, bainite and martensite is directly increased with increasing content and rising cooling rate. The carbon content can affect the strength particularly of the core layer. In order to achieve high strength values of the core layer, the carbon content of the core layer can be adjusted to values of at least 0.3% by weight. The carbon content of the core layer can be limited to a maximum of 0.5% by weight, especially 0.45% by weight, in order to limit the brittleness of the steel of the core layer and the adverse effect on the welding characteristics. A rise in strength with increasing carbon content is always accompanied by a loss of formability, an increasing tendency to initiation of cracking and advancement of cracking or an increasing tendency to hydrogen-induced cracking as a result of the increase in the residual stresses in the microstructure on formation of bainitic-martensitic constituents. In order to ensure an outer layer having elongation properties according to the invention, the C content of the steel of the outer layer can be limited to up to 0.09% by weight. In this case, an essentially ferritic-pearlitic microstructure configuration can be expected for the steel of the outer layer.

Silicon is an alloy element which contributes to solid solution hardening and to increasing strength, and which finds use in conventional comparatively high-strength steels such as microalloyed steels according to DIN EN 10268 (2013-12), such as HC300LA-HC500LA. One example of a steel concept employed is HC340LA with materials number 1.0548. The steels have cold formability and are of particularly good suitability as a material for the outer layer of the flat steel product of the invention. The Si content of the steels used for the outer layer of the flat steel product of the invention can be limited to a maximum of 0.7% by weight, in order to avoid impairment of the coatability of the flat steel products in hot-dip coating finishing operations as a result of formation of near-surface oxides. The Si content of the steels used for the core layer is preferably at least 0.150% by weight and at most 0.350% by weight, in order to advantageously affect the conversion characteristics. Si contents of at least 0.150% by weight have a positive effect with regard to the avoidance of cementite and pearlite formation in the course of cooling. With rising Si content, there is an increase in the A3 conversion temperature. Thus, there is a rising risk at comparatively low furnace temperatures of not achieving complete austenitization and hence of restricting hardenability. Therefore, in the present case, no contents above 0.350% by weight are employed.

Manganese as an alloy element contributes to solid solution hardening of the steel. By means of rising Mn contents, it is especially possible to increase the tensile strength. By addition of manganese, it is also possible to increase the hardenability of the steel by lowering the A3 temperature and moving the formation of the diffusion-controlled transition phases ferrite, pearlite and bainite to longer times and hence facilitating conversion to the martensite stage even at comparatively low cooling rates. Steels which are used for the core layer may, for improvement of hardenability, have Mn contents of at least 1.10% by weight. The Mn contents of the steels which are used for the core layer can, for reasons of cost, be limited to values of up to 1.40% by weight, since Mn contents over and above 1.40% by weight are not required to affect the conversion characteristics of the core layer. Steels which are used for the outer layer may, to improve the strength, preferably include at least 0.10% by weight of manganese. They should not include more than 1.9% by weight of manganese, because Mn contents above 1.9% by weight have an adverse effect on the hot dip-coating properties of the flat steel product of the invention.

Aluminum is used for deoxidation of the molten steel which is used both for the core layer and the outer layer. In addition, aluminum contributes to grain refinement. Aluminum contents above 0.06% by weight increased the frequency of occurrence and size of nonmetallic inclusions, which contributes to the formation of surface defects.

Chromium has a delaying effect on austenite conversion and increases the through-hardenability of the steels used. In steels which are used as core layer, a chromium content of at least 0.10% by weight assures the desired effect on the conversion. However, the Cr content should not exceed 0.50% by weight, since the conversion-influencing effect is sufficient up to these contents and can be implemented in an inexpensive manner. In the outer layer too, it is advantageous to adjust and to control the strength in a specific manner via the influencing of conversion by chromium. However, this is appropriate to a lesser degree than for the core layer. In this respect, it is also possible to use material concepts where chromium is included in the alloy and is used to control the conversion. For the outer layer, moreover, the wettability of the steel surface during the hot dip-coating operation likewise plays a limiting role. Therefore, the Cr content should especially not exceed 0.40% by weight. For the outer layer, furthermore, steels which do not include any Cr in the alloy may be used. Therefore, more particularly, a lower limit of 0.025% by weight is fixed, which corresponds to the residual content of a melting-related impurity.

Titanium as an alloy element is frequently used for hot forming, in conjunction with boron, especially in the case of high-strength manganese-boron steels. Titanium serves for reliable fixing of nitrogen in the form of titanium nitride (TiN), and the formation of TiN, because of the thermodynamic conditions, takes place even at very high temperatures of around 1400° C. and higher in the partly molten state. As a result of this, the separation of BN is prevented and free boron can become effective in terms of delaying of ferrite and pearlite conversion in particular, i.e. to improve hardenability. These mechanisms can accomplish simple and inexpensive establishment of a maximum hardness of the core material. The core layer should have at least 0.02% by weight of titanium in order to assure reliable binding of the nitrogen. The core layer need not have more than 0.04% by weight of titanium because addition of more than 0.04% by weight of Ti to the alloy for the purpose of TiN formation is unnecessary, given a maximum of 0.007% by weight of nitrogen. The steel used for the outer layer may include different steels that are softer compared to the core layer. Soft steels are especially understood to mean steels having tensile strengths of less than or equal to 750 MPa, especially less than or equal to 500 MPa. Examples of such steels are microalloyed steels such as HC300LA or soft unalloyed steels such as DC01-DC04 or IF steels such as DC05-DC07 according to DIN EN 10268 (2013-12). The steels usable for the outer layer therefore do not require, depending on the concept, any deliberate addition of titanium to the alloy; in this respect, the minimum titanium content can be fixed at the residual content of a melting-related impurity at the level of 0.002% by weight of titanium. For the outer layer, it is also possible to use soft IF steels where titanium is used for fixing of interstitially dissolved elements such as nitrogen and carbon and, in addition, to increase grain fineness and particle size stability. With rising titanium content, there is growth in the deformation resistance on rolling, which has an unfavorable effect on rolling performance, and the recrystallization capacity of the steel is restricted. Therefore, the titanium content of the outer layer is not more than 0.13% by weight. More particularly, it is advantageous for reasons of cost when the titanium content of the outer layer is not more than 0.12% by weight.

Niobium can be used in IF steels for fixing of nitrogen and carbon. If soft IF steels are to be used for the outer layer, it is appropriate for fixing of nitrogen and carbon to include niobium in the alloy at up to 0.025% by weight. In cases where steels killed with aluminum are used for the outer layer, it is possible to dispense with addition of niobium to the alloy.

Boron improves the hardenability of suitable materials in press-hardening. Suitable materials are understood to mean primarily heat-treatable steels as described, for example, in DIN EN 10083, Parts 2 and 3. One example of a heat-treatable steel is 38MnB5 with materials number 1.5532. In order to achieve the effect of delaying conversion in a steel used for the core layer, contents of at least 0.002% by weight of boron are needed. When more than 0.004% by weight of boron is included in the alloy, there is a saturation effect, meaning that no significant enhancement of hardenability is detectable any longer even with a further increase in the boron content. Since, at the same time, the proneness to heat cracking also rises with increasing boron content, inclusion of boron in the alloy up to a maximum of 0.004% by weight may contribute to reducing the tendency to heat-cracking. In a particularly reliable manner, boron-induced heat cracks in steels used for the core layer can be avoided at boron contents of not more than 0.003% by weight.

BRIEF DESCRIPTION OF THE DRAWINGS

The invention is elucidated in detail by working examples hereinafter. The figures show.

DESCRIPTION OF THE INVENTION

Figure 1:
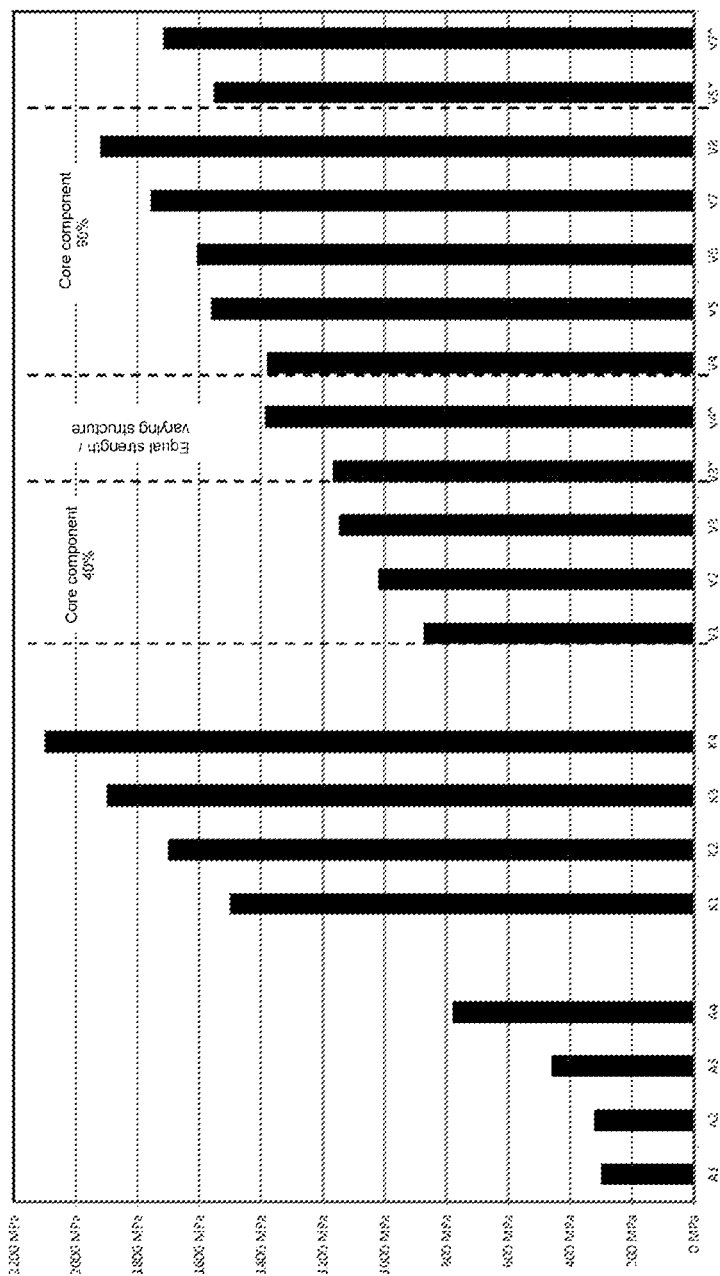
FIG. 1 a diagram in which the tensile strengths of component samples produced by hot press-hardening from conventional flat steel products and inventive flat steel products are listed.

Commercially available flat steel products A1-A4 and K1-K4 produced in a conventional manner have been used to produce, by roll cladding, flat steel products V1, V2, V3, V3*, V4*, V4, V5, V5*, V6, V7, V7* and V8 in the form of a material composite. The respective composition of the flat steel products A1-A4 consisting of soft steels and of the flat steel products K1-K4 consisting of high-strength steels are specified in table 1.

Table 2 notes which flat steel product A1-K4 has formed the respective core layer CL, which product has formed the respective outer layers OL and what proportion P-CL was possessed by the core layer CL of the thickness of the respective composite material flat steel product V1-V8. The range of the tensile strengths Rm which could be ascertained for the respective components obtained by press-hardening from the composite material flat steel products V1-V8 is additionally reported in table 2.

For the roll-cladding operation, sheet metal blanks of the mutually combined flat steel products A1-K4 have been placed one on top of another to form stacks, in each of which a core layer CL was arranged between two outer layers OL. For each of the two outer layers, flat steel products of the same composition and thickness were used. The sheet metal blanks have previously been cleaned at least on the surface thereof that adjoins the neighboring sheet metal blank in each case in the stack and have been mechanically processed such that very substantially full-area contact was assured. The sheet metal blanks in the respective stacks have then been welded to one another. The fixed composite thus formed has been hot-rolled in one or more stages to give a composite material flat steel product having a thickness of, for example, 3 mm. Finally, the composite material flat steel product obtained can also be subjected to a cold-rolling operation in order to further reduce its thickness. The process procedure followed in the roll-cladding operation is described specifically in DE 10 2005 006 606 B3, the content of which is incorporated into the present application for the purpose of elucidation.

Sheet bars have been divided from the composite material flat steel products V1-V8 thus obtained and formed by press-hardening to steel components of identical form. For this purpose, the sheet bars consisting of the composite materials V1-V8 have been heated to a temperature above the highest austenitization temperature of the steels in the respective combined flat steel products A1-A4, K1-K4. The temperatures attained are typically within the range of 900-950° C. Subsequently, the sheet bars have been formed in a cooled press mold. In the course of forming, in the press mold, rapid cooling was effected at a cooling rate of at least 27 K/s, for example 27-30 K/s, such that hardening microstructure was present in the finished press-formed sample components formed from the sheet bars. The hardening structure of the composite materials consisted, in the core layer, entirely of martensite, whereas the outer layers had a maximum of 40% by volume of martensite.

For comparison, sample components have been produced by press-hardening conducted in the same way from each of the flat steel products A1-K4, the form of which likewise corresponded to the components produced from the composite material flat steel products V1-V8. The tensile strength Rm and elongation A80 in the hardened state were determined on the sample components produced from the flat steel products A1-K4 in accordance with DIN EN ISO 6892-1 and entered into table 1.

As apparent from FIG. 1, it was possible via the choice of the thickness component of the core layer CL consisting of high-strength steel in each case to directly influence the strength of the respective flat steel products V1-V8. The strength of the components of the invention was always above the maximum strength of the components consisting of the soft steels A1-A4.

Figure 2:
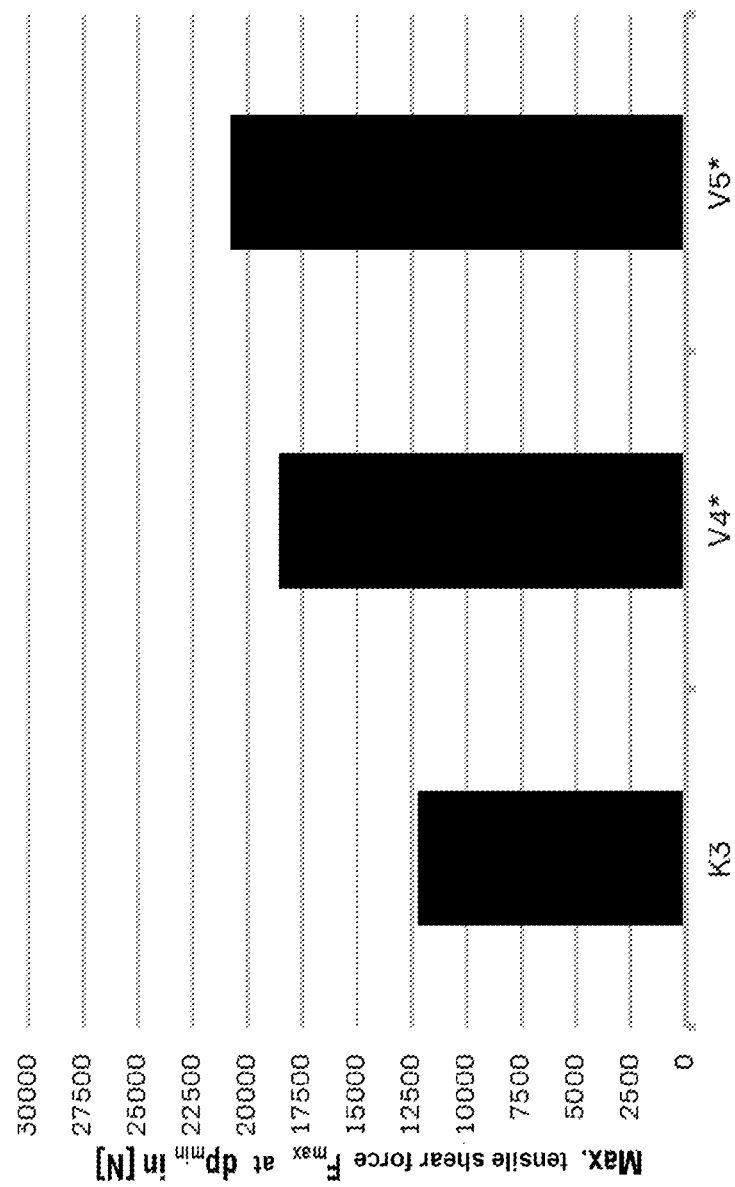
FIG. 2 a diagram in which, for component samples produced by hot press-hardening from a conventional flat steel product and two flat steel products, the results of the test conducted according to SEP 1220 on a weld point, tensile shear forces recorded before fracture are recorded.

FIG. 2 shows the results of a tensile shear force test conducted in accordance with SEP 1220, these having been conducted on welded component samples produced by hot press-hardening. One group of component samples studied consisted of the conventional flat steel product K3, one consisted of the flat steel product V4*, and another consisted of the inventive flat steel product V5*. The experiments show that the welds in the component sample produced from the inventive flat steel product V5* each sustain tensile shear forces well above the tensile shear forces sustained by the welds of the component sample consisting of the flat steel products K3 and V4*.

Figure 3:
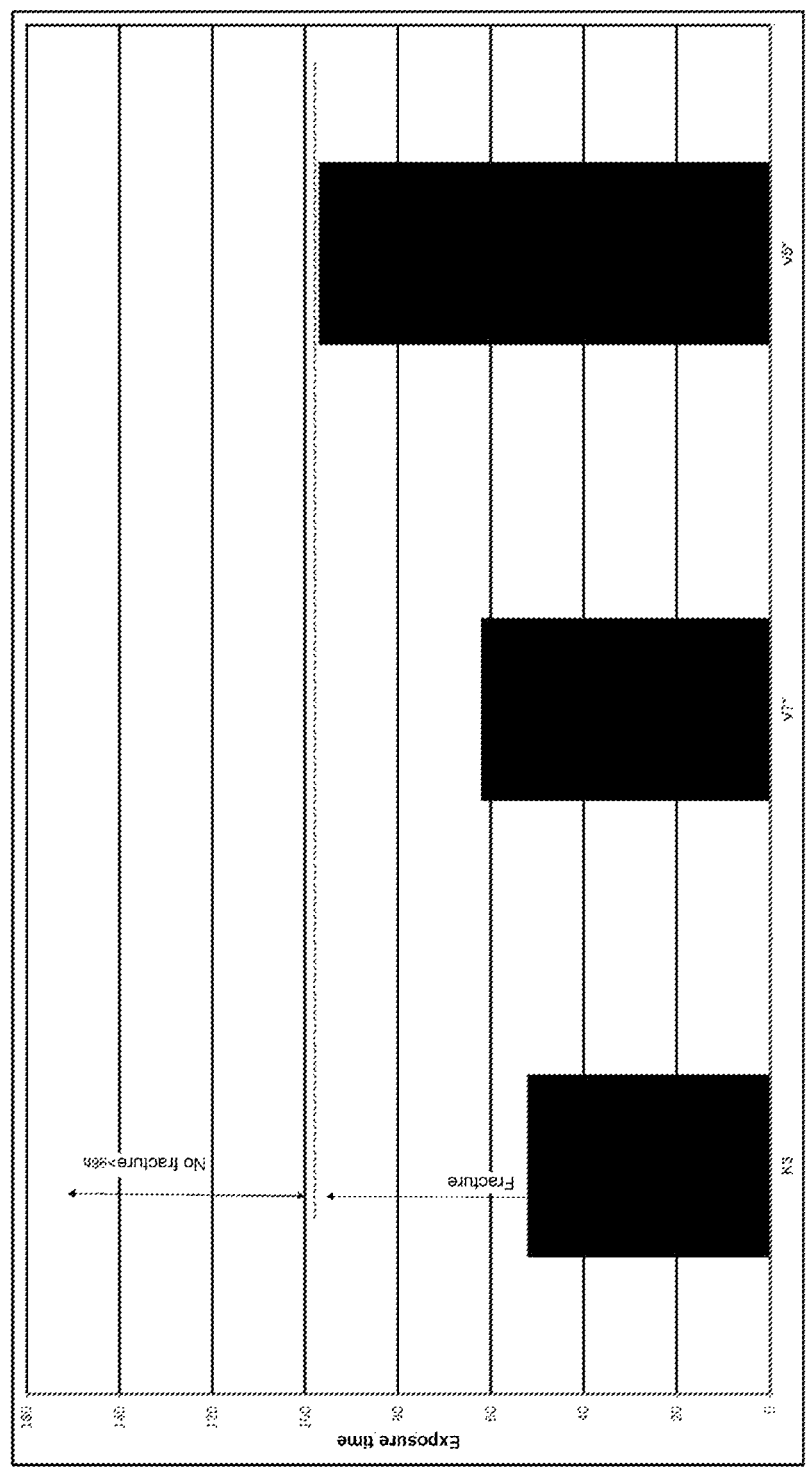
FIG. 3 the results of testing in accordance with DIN EN ISO 7539-2 of delayed fracture in the case of component samples produced from a conventional flat steel product and two inventive flat steel products.

FIG. 3 shows the results of four-point bending tests conducted in accordance with DIN EN ISO 7539-2 with exposure to a corrosive medium, which have been conducted on component samples produced by hot press-hardening. One group of component samples examined consisted of the conventional flat steel product K3, one consisted of the inventive flat steel product V5*, and another consisted of the likewise inventive flat steel product V7*. Here too, the component samples produced from the inventive flat steel product were distinctly superior to the sample produced from the flat steel product K3. Thus, in the case of the component samples consisting of the flat steel product K3, there was cracking after an exposure time of only 52 hours, whereas fracture occurred in the case of the component sample consisting of the inventive flat steel product V7* only after 62 hours and, in the case of the component sample consisting of the inventive flat steel product V5*, no fracture occurred up to 97 hours.

TABLE 1

|    | C      | Si    | Mn    | P     | S      | Al     | Cr     | NB     | Ti     | B      | Rm [MPa] | A80 [%] |    |
|----|--------|-------|-------|-------|--------|--------|--------|--------|--------|--------|----------|---------|----|
| A1 | 0.0030 | 0.020 | 0.130 | 0.010 | 0.0120 | 0.0325 | 0.0500 | 0.0050 | 0.0700 | 0.0004 | 300      | 35      | IV |
| A2 | 0.0375 | 0.040 | 0.250 | 0.015 | 0.0150 | 0.0400 | 0.0600 | 0.0040 | 0.0040 | 0.0006 | 320      | 34      | IV |
| A3 | 0.0700 | 0.205 | 0.800 | 0.020 | 0.0060 | 0.0400 | 0.0750 | 0.0200 | 0.0040 | —      | 460      | 15      | IV |

TABLE 1-continued

|    | C      | Si    | Mn    | P     | S      | Al     | Cr     | NB     | Ti     | B      | Rm [MPa] | A80 [%] |    |
|----|--------|-------|-------|-------|--------|--------|--------|--------|--------|--------|----------|---------|----|
| A4 | 0.0750 | 0.600 | 1.775 | 0.015 | 0.0030 | 0.0350 | 0.3500 | 0.0100 | 0.1200 | 0.0005 | 780      | 10      | IV |
| K1 | 0.2350 | 0.250 | 1.300 | 0.010 | 0.0015 | 0.0350 | 0.1500 | 0.0015 | 0.0300 | 0.0028 | 1500     | 6       | CP |
| K2 | 0.2850 | 0.275 | 1.175 | 0.018 | 0.0013 | 0.0350 | 0.4500 | 0.0030 | 0.0325 | 0.0028 | 1700     | 5       | IV |
| K3 | 0.3500 | 0.250 | 1.300 | 0.010 | 0.0015 | 0.0350 | 0.1400 | 0.0015 | 0.0325 | 0.0028 | 1900     | 5       | IV |
| K4 | 0.4200 | 0.225 | 1.300 | 0.020 | 0.0030 | 0.0350 | 0.3500 | 0.0030 | 0.0275 | 0.0030 | 2100     | 4       | IV |

Alloy figures in % by weight, remainder iron and unavoidable impurities;
IV = inventive,
CP = comparative example

TABLE 2

| Component | OL | CL | P-CL | Rm [MPa]  |    |
|-----------|----|----|------|-----------|----|
| V1        | A2 | K1 | 40%  | 800-900   | CP |
| V2        | A1 | K4 | 40%  | 1000-1100 | IV |
| V3        | A4 | K2 | 40%  | 1100-1200 | IV |
| V3*       | A3 | K1 | 60%  | 1100-1200 | CP |
| V4*       | A3 | K1 | 80%  | 1300-1400 | CP |
| V4        | A1 | K1 | 90%  | 1300-1400 | CP |
| V5        | A2 | K2 | 90%  | 1500-1600 | IV |
| V5*       | A3 | K3 | 70%  | 1500-1600 | IV |
| V6        | A4 | K2 | 90%  | 1600-1700 | IV |
| V7        | A3 | K3 | 90%  | 1700-1800 | IV |
| V7*       | A3 | K3 | 80%  | 1700-1800 | IV |
| V8        | A1 | K4 | 90%  | 1900-2000 | IV |

The invention claimed is:

1. A flat steel product comprising
a core layer comprising a steel having a tensile strength of at least 1700 MPa, and
an outer layer which is cohesively bonded to the core layer, the outer layer having a tensile strength of not more than half the tensile strength of the steel of the core layer in a ready-hardened state and elongation A80 that is at least 1.5 times the elongation A80 of the core layer in the ready-hardened state,
wherein the core layer comprises a steel which, as well as iron and unavoidable impurities comprises 0.3-0.5% by weight of C, 0.150-0.350% by weight of Si, 1.100-1.400% by weight of Mn, 0.020-0.050% by weight of Al, 0.100-0.500% by weight of Cr, 0.020-0.040% by weight of Ti and 0.002-0.004% by weight of B, where the impurities include up to 0.020% by weight of P, up to 0.003% by weight of S, up to 0.100% by weight of Cu, up to 0.050% by weight of Mo, up to 0.007% by weight of N, up to 0.100% by weight of Ni, up to 0.003% by weight of Nb, up to 0.010% by weight of V, up to 0.030% by weight of Sn and up to 0.005% by weight of Ca, and
wherein the outer layer comprises a steel which, as well as iron and unavoidable impurities comprises up to 0.09% by weight of C, up to 0.7% by weight of Si, 0.10-1.9% by weight of Mn, up to 0.06% by weight of Al, up to 0.4% by weight of Cr, up to 0.025% by weight of Nb and up to 0.13% by weight of Ti, wherein the impurities include up to 0.025% by weight of P, up to 0.015% by weight of S, up to 0.15% by weight of Cu, up to 0.05% by weight of Mo, up to 0.006% by weight of N, up to 0.15% by weight of Ni, up to 0.02% by weight of V, up to 0.001% by weight of B, up to 0.04% by weight of Sn and up to 0.003% by weight of Ca.

2. The flat steel product as claimed in claim 1, wherein the core layer makes up 40-95% of the thickness of the flat steel product.

3. The flat steel product as claimed in claim 2, wherein the core layer makes up 60-<70% of the thickness of the flat steel product.

4. The flat steel product as claimed in claim 2, wherein the core layer makes up 70-95% of the thickness of the flat steel product.

5. The flat steel product as claimed in claim 1, wherein the tensile strength of the outer layer is not more than one third of the tensile strength of the core layer in the ready-hardened state.

6. The flat steel product as claimed in claim 1, wherein, in the ready-hardened state, the elongation A80 of the outer layer is at least twice as high as the elongation A80 of the core layer.

7. The flat steel product as claimed in claim 1, wherein the core layer comprises a steel which comprises, as well as iron and unavoidable impurities (in % by weight)
C: 0.3-0.45%,
Si: 0.2-0.28%,
Mn: 1.15-1.3%,
Al: 0.03-0.04%,
Cr: 0.14-0.45%,
Ti: 0.026-0.034%,
and
B: 0.002-0.003%.

8. The flat steel product as claimed in claim 1, wherein the outer layer comprises a steel which comprises, as well as iron and unavoidable impurities (in % by weight)
C: 0.002-0.075%,
Si: 0.01-0.6%,
Mn: 0.13-1.8%,
Al: 0.03-0.04%,
Cr: 0.025-0.35%,
Nb: 0.002-0.02%,
and
Ti: 0.002-0.12%.

9. A flat steel product comprising
a core layer comprising a steel having a tensile strength of more than 1500 MPa, and
an outer layer which is cohesively bonded to the core layer, the outer layer having a tensile strength of not more than one third the tensile strength of the steel of the core layer in a ready-hardened state and elongation A80 that is at least 1.5 times the elongation A80 of the core layer in the ready-hardened state,
wherein the core layer comprises a steel which, as well as iron and unavoidable impurities comprises 0.3-0.5% by weight of C, 0.150-0.350% by weight of Si, 1.100-1.400% by weight of Mn, 0.020-0.050% by weight of Al, 0.100-0.500% by weight of Cr, 0.020-0.040% by weight of Ti and 0.002-0.004% by weight of B, where the impurities include up to 0.020% by weight of P, up to 0.003% by weight of S, up to 0.100% by weight of Cu, up to 0.050% by weight of Mo, up to 0.007% by weight of N, up to 0.100% by weight of Ni, up to 0.003% by weight of Nb, up to 0.010% by weight of V, up to 0.030% by weight of Sn and up to 0.005% by weight of Ca, and wherein the outer layer comprises a steel which, as well as iron and unavoidable impurities comprises up to 0.09% by weight of C, up to 0.7% by weight of Si, 0.10-1.9% by weight of Mn, up to 0.06% by weight of Al, up to 0.4% by weight of Cr, up to 0.025% by weight of Nb and up to 0.13% by weight of Ti, wherein the impurities include up to 0.025% by weight of P, up to 0.015% by weight of S, up to 0.15% by weight of Cu, up to 0.05% by weight of Mo, up to 0.006% by weight of N, up to 0.15% by weight of Ni, up to 0.02% by weight of V, up to 0.001% by weight of B, up to 0.04% by weight of Sn and up to 0.003% by weight of Ca.

10. The flat steel product as claimed in claim 9, wherein the core layer makes up 40-95% of the thickness of the flat steel product.

11. The flat steel product as claimed in claim 10, wherein the core layer makes up 60-<70% of the thickness of the flat steel product.

12. The flat steel product as claimed in claim 10, wherein the core layer makes up 70-95% of the thickness of the flat steel product.

13. The flat steel product as claimed in claim 9, wherein, in the ready-hardened state, the elongation A80 of the outer layer is at least twice as high as the elongation A80 of the core layer.

14. The flat steel product as claimed in claim 9, wherein the core layer comprises a steel which comprises, as well as iron and unavoidable impurities (in % by weight)
C: 0.3-0.45%,
Si: 0.2-0.28%,
Mn: 1.15-1.3%,
Al: 0.03-0.04%,
Cr: 0.14-0.45%,
Ti: 0.026-0.034%,
and
B: 0.002-0.003%.

15. The flat steel product as claimed in claim 9, wherein the outer layer comprises a steel which comprises, as well as iron and unavoidable impurities (in % by weight)
C: 0.002-0.075%,
Si: 0.01-0.6%,
Mn: 0.13-1.8%,
Al: 0.03-0.04%,
Cr: 0.025-0.35%,
Nb: 0.002-0.02%,
and
Ti: 0.002-0.12%.

16. A flat steel product comprising
a core layer comprising a steel having a tensile strength of more than 1500 MPa, and
an outer layer which is cohesively bonded to the core layer, the outer layer having a tensile strength of not more than half the tensile strength of the steel of the core layer in a ready-hardened state and elongation A80 that is at least 1.5 times the elongation A80 of the core layer in the ready-hardened state, wherein the core layer comprises a steel which, as well as iron and unavoidable impurities comprises 0.3-0.5% by weight of C, 0.150-0.350% by weight of Si, 1.100-1.400% by weight of Mn, 0.020-0.050% by weight of Al, 0.100-0.500% by weight of Cr, 0.020-0.040% by weight of Ti and 0.002-0.004% by weight of B, where the impurities include up to 0.020% by weight of P, up to 0.003% by weight of S, up to 0.100% by weight of Cu, up to 0.050% by weight of Mo, up to 0.007% by weight of N, up to 0.100% by weight of Ni, up to 0.003% by weight of Nb, up to 0.010% by weight of V, up to 0.030% by weight of Sn and up to 0.005% by weight of Ca, and wherein the outer layer comprises a steel which, as well as iron and unavoidable impurities comprises 0.002-0.075% by weight of C, 0.01-0.6% by weight of Si, 0.13-1.8% by weight of Mn, 0.03-0.04% by weight of Al, 0.025-0.35% by weight of Cr, 0.002-0.02% by weight of Nb and 0.002-0.12% by weight of Ti, wherein the impurities include up to 0.025% by weight of P, up to 0.015% by weight of S, up to 0.15% by weight of Cu, up to 0.05% by weight of Mo, up to 0.006% by weight of N, up to 0.15% by weight of Ni, up to 0.02% by weight of V, up to 0.001% by weight of B, up to 0.04% by weight of Sn and up to 0.003% by weight of Ca.

17. The flat steel product as claimed in claim 16, wherein the core layer makes up 40-95% of the thickness of the flat steel product.

18. The flat steel product as claimed in claim 17, wherein the core layer makes up 60-<70% of the thickness of the flat steel product.

19. The flat steel product as claimed in claim 17, wherein the core layer makes up 70-95% of the thickness of the flat steel product.

20. The flat steel product as claimed in claim 16, wherein the core layer comprises a steel which comprises, as well as iron and unavoidable impurities (in % by weight)
C: 0.3-0.45%,
Si: 0.2-0.28%,
Mn: 1.15-1.3%,
Al: 0.03-0.04%,
Cr: 0.14-0.45%,
Ti: 0.026-0.034%,
and
B: 0.002-0.003%.

* * * * *